United States Patent [19]
Fink

[11] Patent Number: 5,820,162
[45] Date of Patent: Oct. 13, 1998

[54] AIRBAG SYSTEM INFLATOR

[75] Inventor: Michael Fink, Indianapolis, Ind.

[73] Assignee: AirBelt Systems, LLC., Bel Air, Calif.

[21] Appl. No.: 656,374

[22] Filed: Mar. 21, 1996

[51] Int. Cl.$^6$ .................................................. B60R 21/26
[52] U.S. Cl. .................. 280/742; 137/68.13; 137/68.19; 137/71; 137/79; 222/3; 222/504; 280/735; 280/736; 280/737; 280/741
[58] Field of Search .................. 280/742, 741, 280/737, 736, 735, 734, 740; 222/3, 504; 137/68.13, 68.19, 71, 79, 543.15

[56] References Cited

U.S. PATENT DOCUMENTS

| | | |
|---|---|---|
| 3,122,154 | 2/1964 | Siebel et al. . |
| 3,752,500 | 8/1973 | Culver . |
| 3,787,067 | 1/1974 | Bernard . |
| 4,131,300 | 12/1978 | Radke et al. ............................. 280/737 |
| 4,267,853 | 5/1981 | Yamaguchi et al. ....................... 137/67 |
| 5,209,510 | 5/1993 | Mamiya . |
| 5,221,109 | 6/1993 | Marchant . |
| 5,368,329 | 11/1994 | Hock . |
| 5,400,487 | 3/1995 | Gloutsos et al. . |
| 5,439,249 | 8/1995 | Steffens, Jr. et al. ................... 280/735 |
| 5,460,405 | 10/1995 | Faigle et al. ............................ 280/735 |
| 5,618,057 | 4/1997 | Johnson et al. ...................... 137/543.15 |

OTHER PUBLICATIONS

Temperature Compensated Stored Gas Inflator, Breed Technologies 1996, Society of Automotive Engineers, Inc.

Primary Examiner—Eric D. Culbreth
Attorney, Agent, or Firm—Anthony T. Cascio

[57] ABSTRACT

A spool valve controls the release of gas from a pressure vessel into an airbag upon the release of the gas in the event of a collision. The valve uses pilot pressure acting on either end of the spool to actuate the spool. The position of the spool within the valve determines the flow rate through the valve.

12 Claims, 14 Drawing Sheets

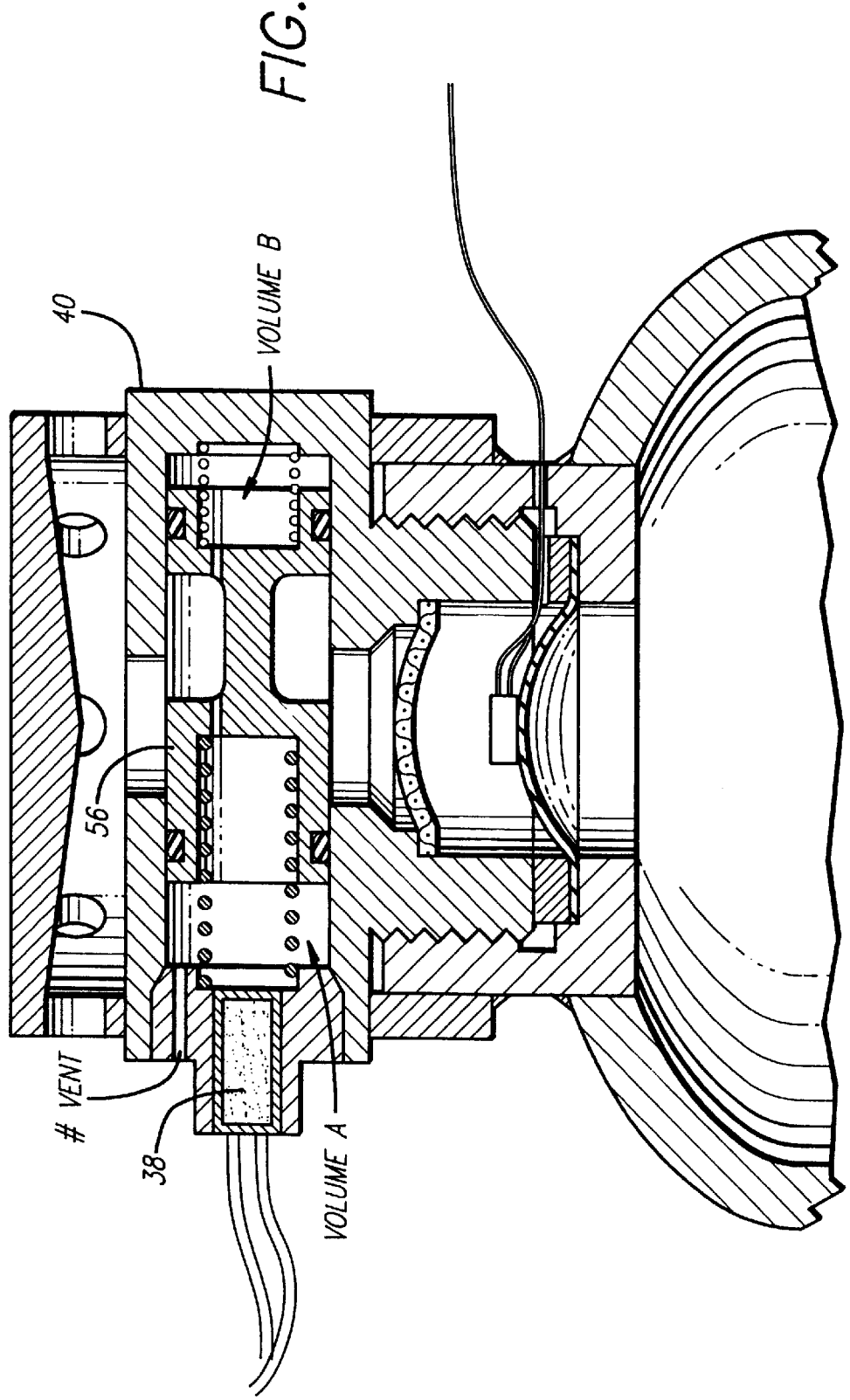

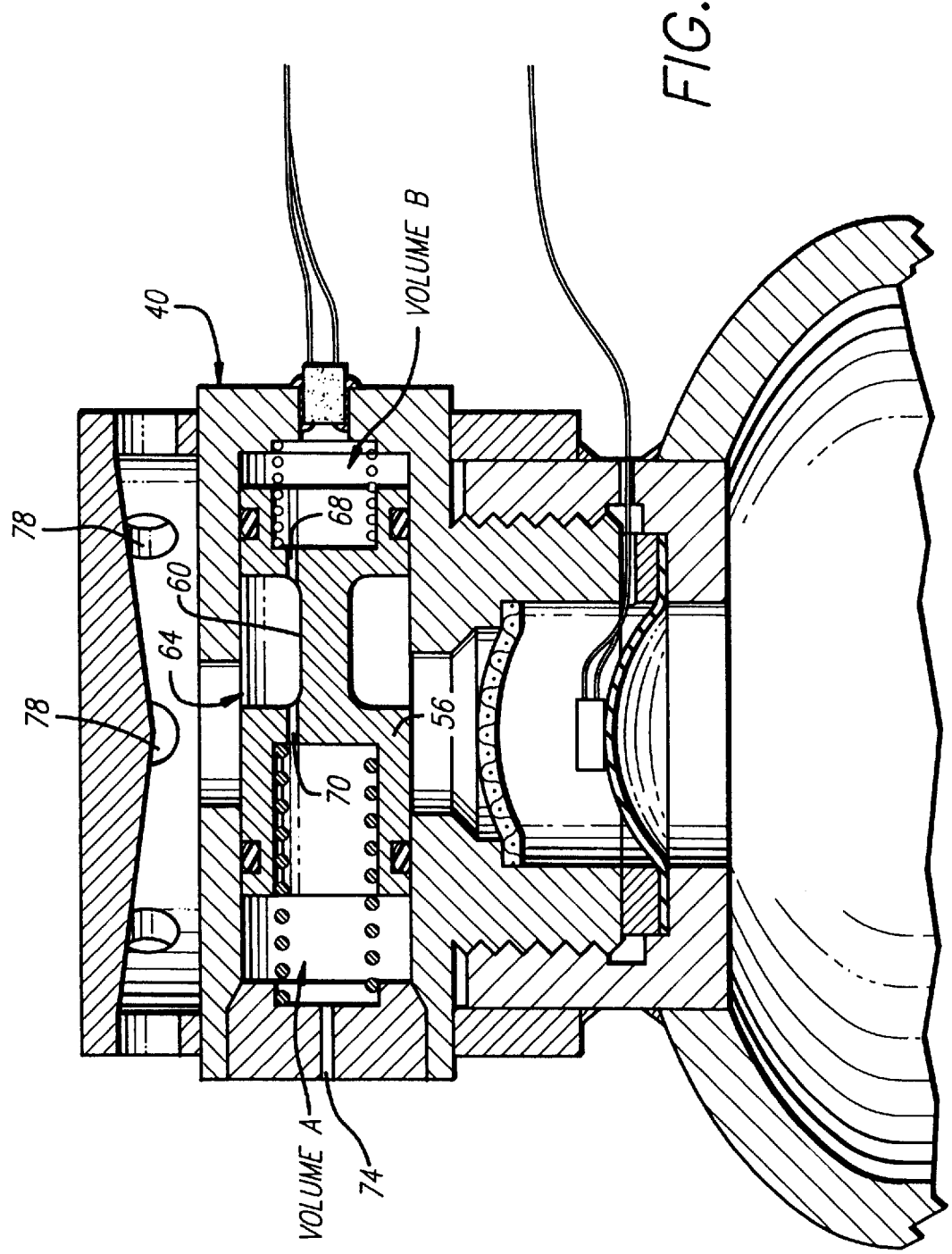

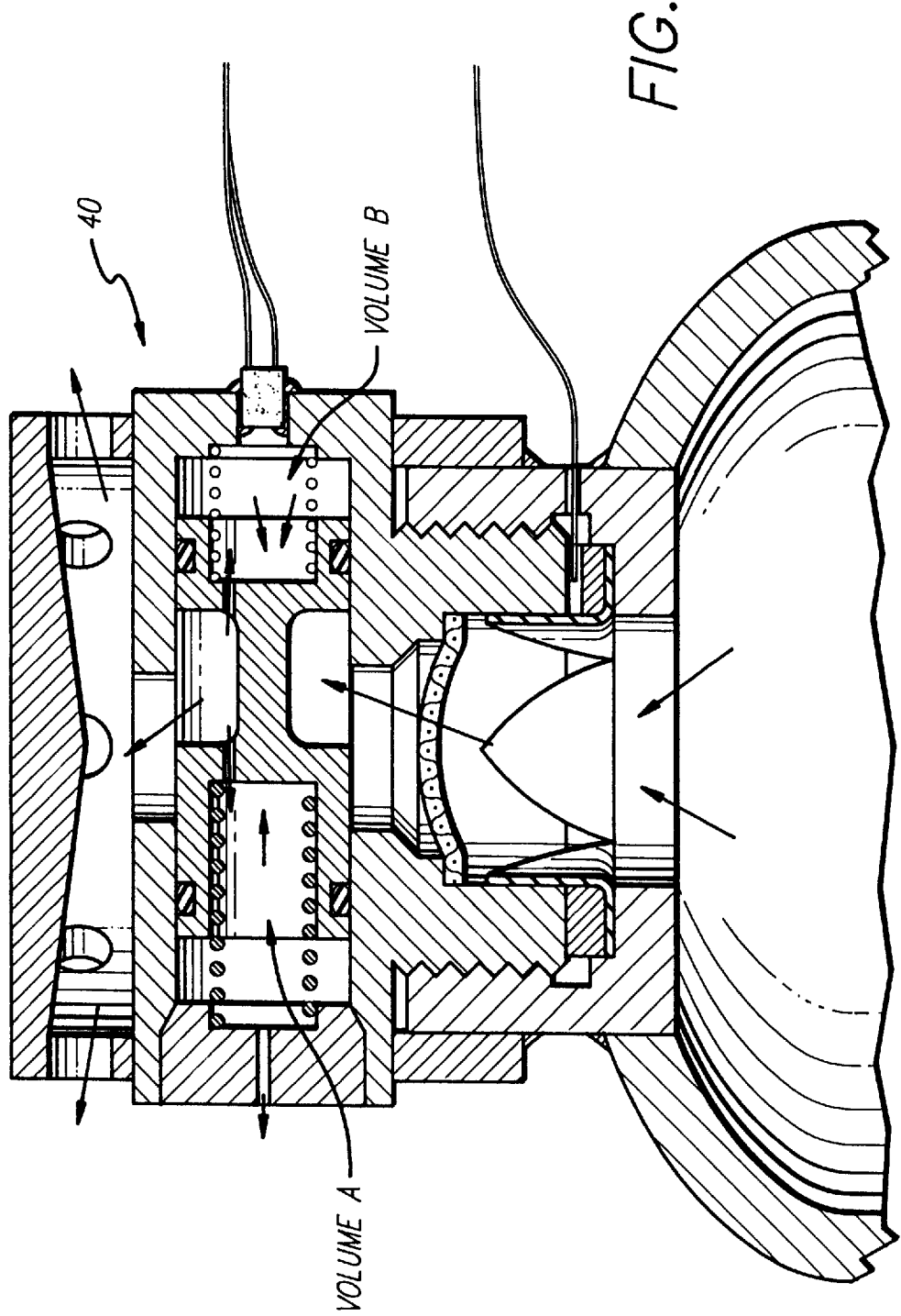

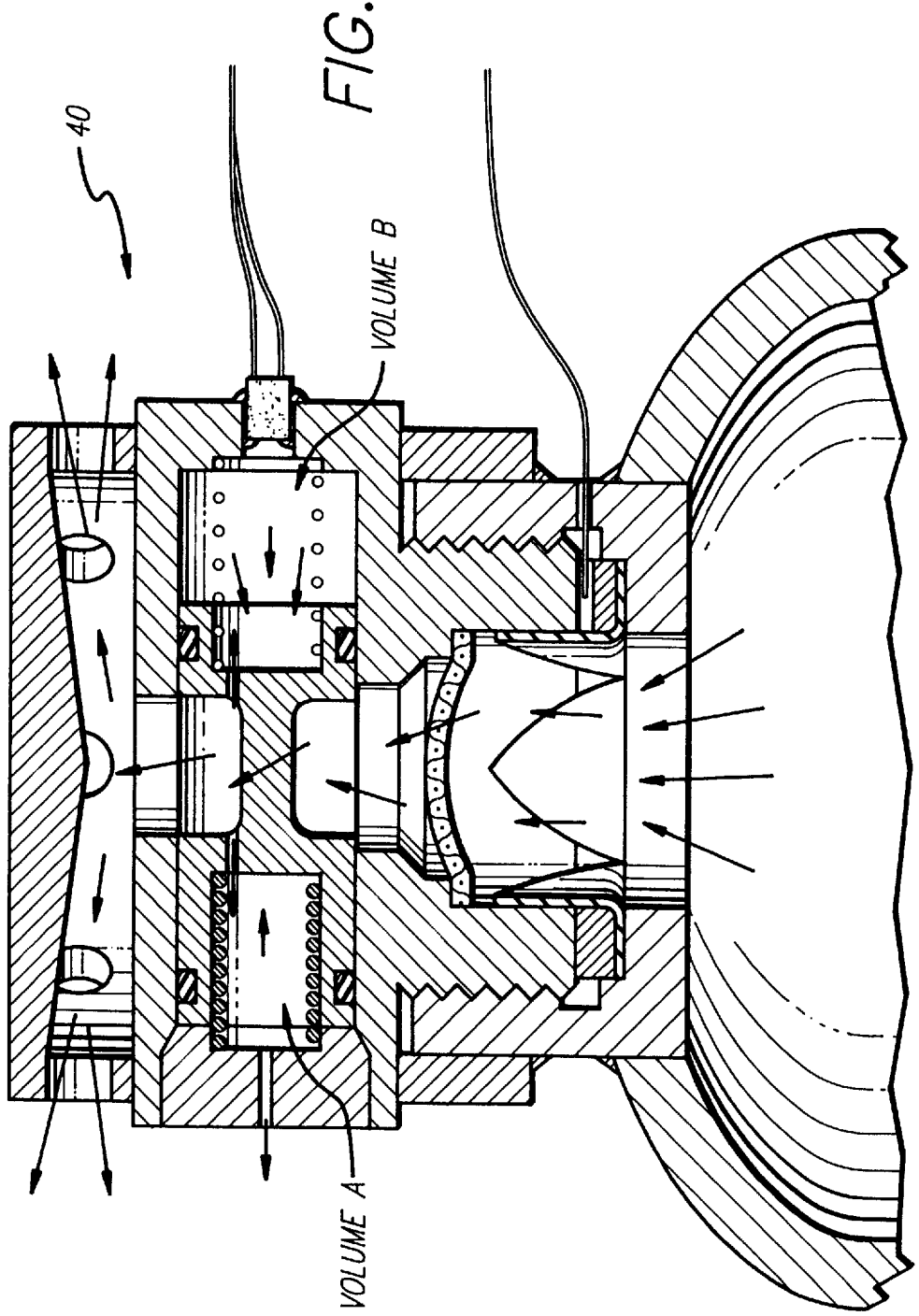

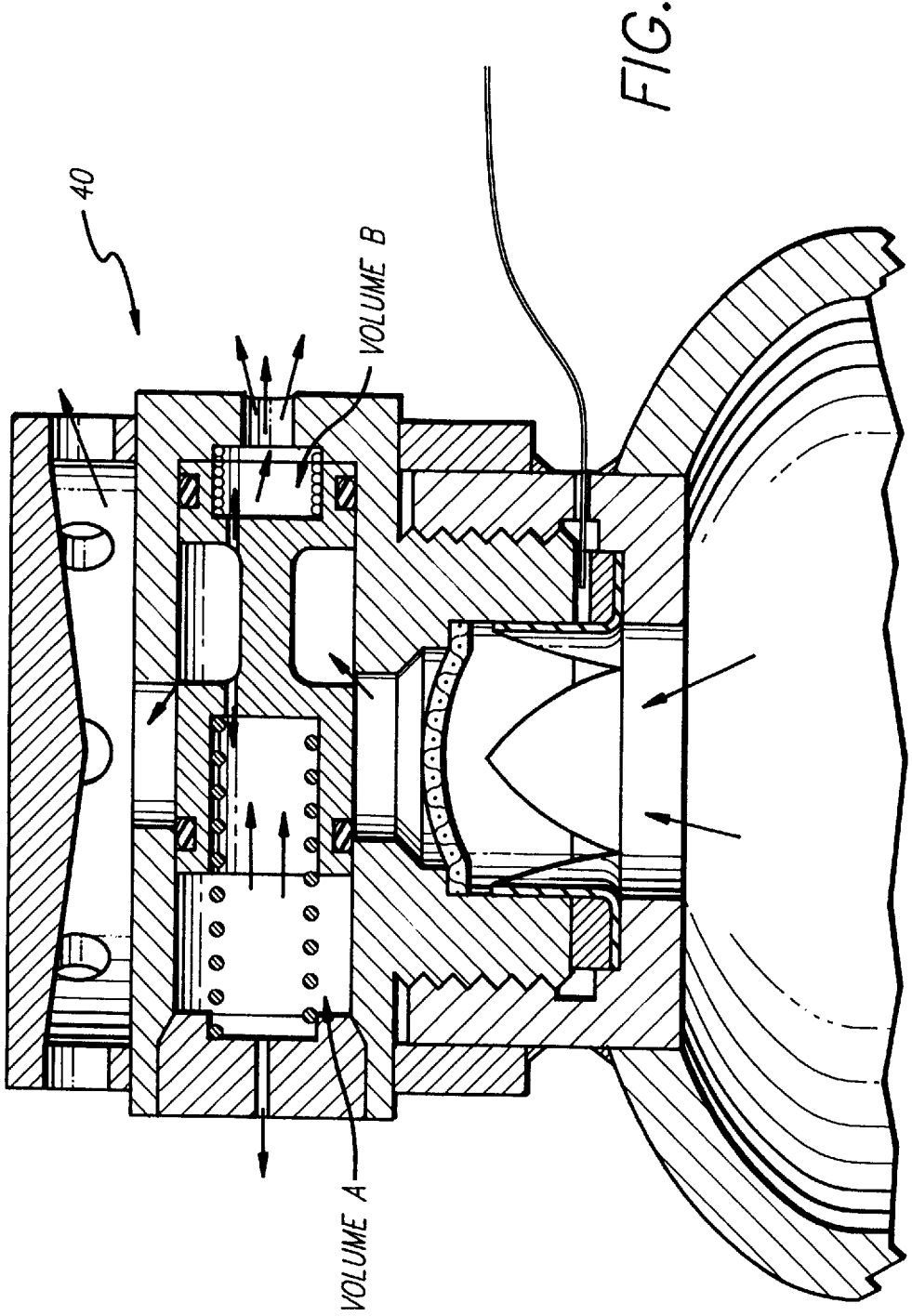

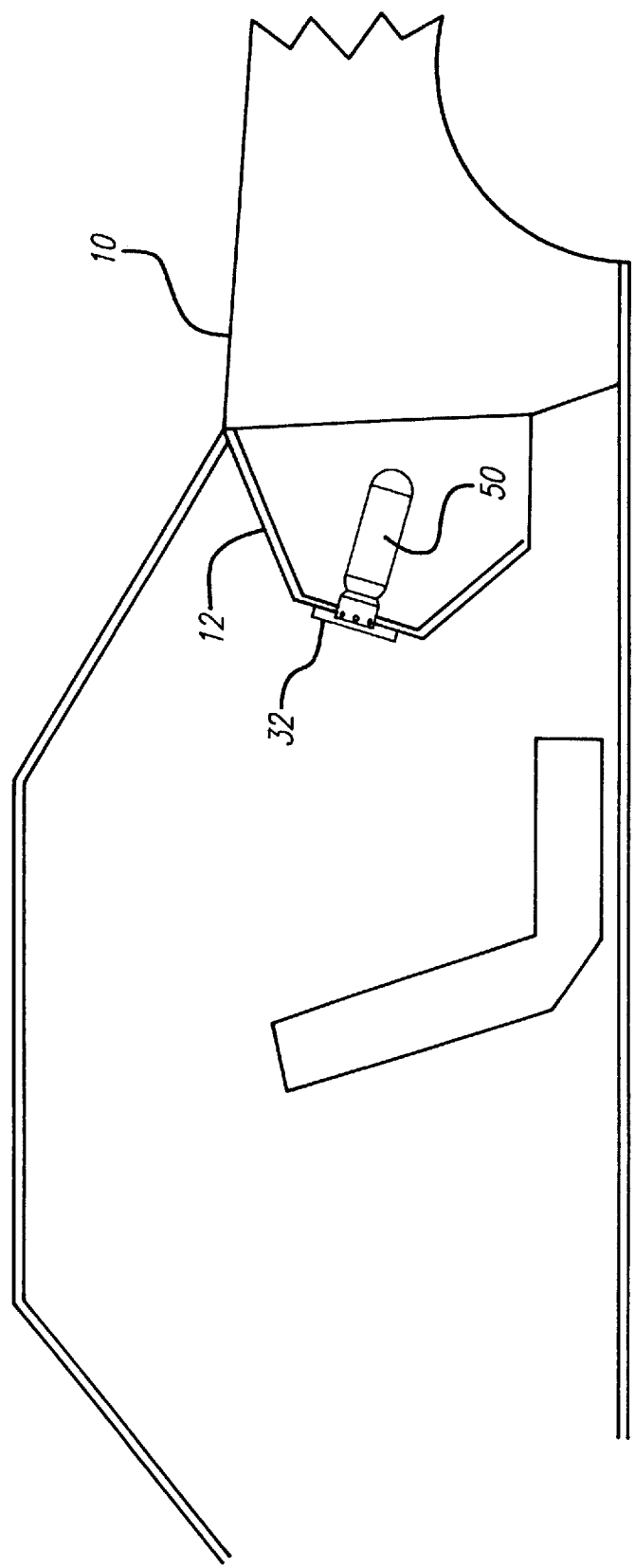

AIRBAG SYSTEM INFLATOR

BACKGROUND OF THE INVENTION

1. Field of the Invention

The present invention relates generally to safety devices to protect passengers of moving vehicles. More particularly, the present invention relates to a valve assembly used to control the flow of pressurized gas from a high pressure vessel into an airbag assembly in a moving vehicle to protect passengers from injury from collisions.

2. Background of the Art

Various vehicle safety devices and passenger restraint systems are known in the art. These devices protect passengers of vehicles, such as automobiles, airplanes, and trains, from injury in the event of a collision. The value of airbags, which inflate in response to collisions to protect the passengers of moving vehicles, has become widely recognized. Airbags are effective in reducing the rate of injury to passengers of vehicles equipped with such systems. Airbags are particularly effective when used in conjunction with conventional safety devices such as lap or shoulder seatbelts.

In a conventional automobile, the airbag protection for the driver is typically installed in the hub of the steering wheel of the vehicle. The airbag itself is a folded, expansible bag constructed of a suitable fabric. An inflator containing a sodium azide propellant is connected to the interior of the airbag. Upon impact, a firing circuit ignites the sodium azide charge, which rapidly generates a hot gas discharge filling the airbag. The bag escapes from the steering wheel hub and expands in front of the driver, cushioning the driver as the driver is thrown forward by the impact and preventing the driver from striking the hard interior surface of the vehicle.

There are many problems associated with inflating an airbag with the hot gas from a sodium azide inflator. Sodium azide is a hazardous chemical. In addition, tremendous heat is released when the airbag is inflated that can potentially burn an occupant's face, arms, hands and legs. Because of the disadvantages of the sodium azide technology, including toxicity, burns, explosions, environment issues, irritating and noxious gases, and chemical degradation, there is a need for an effective inflation system that is not dependent on sodium azide.

An alternative to the sodium azide inflator is a hybrid inflator which uses a compressed source of gas in conjunction with a pyrotechnic chemical to augment the pressure when the airbag is inflated. The hybrid inflator may eliminate sodium azide as a component, although, it still uses chemicals and a combustion process to inflate the airbag producing undesired gaseous emissions. In addition, the hybrid design is complex and may not be reliable. The hybrid inflator design uses a compressed gas source as part of its inflation media.

Conventional compressed source "cold gas" inflator designs are also known in the art. These systems used pure stored compressed gas to inflate the airbag. One of the major concerns that has prevented cold gas inflators from being incorporated into vehicles is the that the output of the inflator is affected by ambient temperature extremes. An airbag inflator is required to function in temperatures ranging from −40 degrees Celsius (−40 degrees Fahrenheit) to 98 degrees Celsius (208 degrees Fahrenheit), which are possible extremes encountered in various locations during cold winter and hot summer conditions. For a compressed source of a fixed volume, it is known by Boyle's Law that the gas pressure increases or decreases in proportion to the ambient temperature, and can be determined by the equation: $(P1)(T1)=(P2)(T2)$. So, for example, a vessel pressurized to 6000 psig at ambient temperature (70 degrees Fahrenheit) would have its internal pressure affected by temperature extremes as follows:

at −40 degrees Fahrenheit, internal pressure=4755 psig at 208 degrees Fahrenheit, internal pressure=7570 psig.

This example shows how the temperature extremes dramatically affect the storage pressures and thus, affect the total outflow of gas volume that will inflate the airbag. As a result of this large variance in vessel pressure, an inflator designed to fill the airbag to proper proportions at the high temperature conditions would fill the airbag to only a fraction of the desired level during the cold extreme conditions, thus producing unfavorable absorbing characteristics for the occupant of the vehicle during an impact. If, on the other hand, the inflator was designed to have proper bag filling characteristics at the low temperature extremes, the airbag would fill to an undesirable high pressure possibly causing the airbag to tear at its seams. In addition, high pressure would produce a very "hard" airbag when the occupant of the vehicle contacts the airbag. Both of these extreme situations are not desirable.

The most common inflators are pyrotechnic and use a combustion process to generate their gas output. This combustion process is also affected by temperature extremes, but not to the same magnitude as a stored compressed gas inflator. The hybrid inflators use a compressed gas source, which is affected by temperature extremes to the same degree as stored compressed gas inflators. These hybrid designs, however, also incorporate pyrotechnic means to generate their gas output which varies less with temperature. Therefore, the overall variance of the hybrid design is less than the pure stored compressed gas design. All inflator designs are affected by temperature variances, to some degree, and the issue of varying pressures must be addressed and compensated to provide appropriate protection under all extreme conditions.

Another concern associated with a high pressure stored gas inflator is that its output flow of gas during the initial vessel opening is, by nature, very violent and aggressive. When the gas is released unregulated into the airbag, it can cause high stress induced loading in the airbag itself or to the occupant, if the occupant is close to the airbag as it opens. It is important, therefore, to provide some means of regulating the gas as it is released from the compressed gas source into the airbag during the initial vessel opening stage.

Another disadvantage of standard stored gas inflators and other conventional inflators is that they cannot adapt their output to provide proper airbag inflation characteristics based on different crash variables which effect the occupant's impact with the airbag.

The effectiveness of the airbag can depend on the way that the airbag inflates in response to any particular collision. Each collision has particular characteristics, such as the speed of the vehicle before the crash and the weight of the occupant of the vehicle. It is therefore important, for the maximum safety of the occupant, to control the inflation rate of the airbag based on these specific characteristics. Each crash condition affects the desired airbag absorbing characteristics. Given the many variables occurring during each unique crash, it is advantageous for the inflator to adapt its output to fill the airbag to the is appropriate proportion and internal pressure level to best match all of the immediate crash variables, and thus, provide the occupant with the best possible airbag decelerating characteristics. An example of possible crash variables are:

crash severity
ambient temperature
occupant weight
occupant position
seatbelt fastened/unfastened.

The airbags in the prior art do not protect every occupant equally. The prior art airbags are designed such that they provide the most protection for a particular occupant—generally, an unbelted fiftieth percentile male, representing the median size and weight of the population of occupants, 160 pounds, at a 30 mile-per-hour crash speed into a rigid barrier. The airbag deploys with the same characteristics in every crash without considering any of the previously mentioned variables, which vary in all crashes. Therefore, a passenger, whose size and weight is considerably different from the median range will experience less than ideal deceleration characteristics from the airbag. A smaller and lighter occupant will have a tendency to rebound off of the airbag, and may be injured from this rebound. A larger and heavier occupant can deflate the airbag, and with the remaining energy, impact the wheel or dash injuring the occupant.

Because of the high forces experienced when the airbag is deployed, an airbag has the potential to cause great harm in non-ideal crash conditions. During a moderate crash condition with a small occupant, it could be undesirable for the airbag to deploy with its normal high force, as the occupant interaction with the airbag could cause injury from the deployment. Since a great majority of the crashes in real world accidents are not ideal, the need for an inflator that can vary depending on changing conditions is apparent.

Several prior art references attempt to address these issues. For example, U.S. Pat. No. 5,400,487, issued to Gioutsos et at., for a Variable Inflation System for Vehicle Safety Restraint, illustrates an inflation system for a gas-operated airbag system. The design creates variable output into the airbag by incorporating multiple gas generators that can be initiated when signaled by a crash processor. To accomplish the task of fine tuning the output of the gas into the airbag, several generators are required since the use of only two separate generators would only allow for either a very low filled bag or a very hard bag. While the multiple generators may provide the final desired bag fill characteristics, the costs of such multiple generators is significant. Additional squibs and chemical generators are required.

U.S. Pat. No. 5,209,510, issued to Mamiya for an Airbag Restraint System for Motor Vehicle, describes an airbag system where the inflation of the airbag can vary depending on whether the crash was high speed (over 30 km/h) or low sped (under 30 km/h). This variable inflation is also accomplished by using multiple gas generators. In addition, this design only attempts to accommodate the speed variable.

Other patents that also attempt to achieve variable inflation rates include U.S. Pat. No. 5,368,329, issued to Hock for a Dual Stage Inflator and U.S. Pat. No. 5,221,109 issued to Marchant for an Airbag Inflator Having Vents to Terminate Inflation.

Accordingly, there is a need for an airbag system with a single inflation source and valve that can control the characteristics of the airbag inflation depending on different variables. There is also a need for a cold gas airbag inflation system that has no toxic chemicals and will not burn the people that the airbag is trying to protect and that will not cause environmental damage when disposed. A stored gas inflator that can compensate for the temperature extremes and regulate the outflow gas to obtain the desired fill rate eliminates many of the concerns noted above.

SUMMARY OF THE INVENTION

The present invention solves the problems discussed above. The inflator is designed to compensate for multiple crash variables and provide an airbag fill rate and pressure to best decelerate the occupant given the specific crash conditions. The present invention allows the flow to be sufficiently rapid to inflate the airbag within a sufficiently short period of time while also controlling the flow into the airbag to prevent injury to the occupant form the inflating airbag. For example, in instances where fully deploying the airbag would cause more harm than protection to the occupant, the inflation rate of the bag would be decreased.

An airbag restraint device is mounted in a vehicle. The airbag system comprises an inflatable airbag that can be positioned in various locations to protect a driver, front passenger, rear seated passengers, or other occupant of the vehicle. An airbag housing contains an inflator system. A compressed gas cylinder contains gas at a high pressure. At one end of the compressed gas cylinder is a means for releasing the gas from the cylinder. The means can be a nozzle assembly comprised of a burst disc that can open to release the pressurized gas to fill the airbag. The burst disc can be scored. An actuating device can be used to open or "burst" the burst disc, thereby releasing the gas from the cylinder. This burst disc opening means can be a detonator, piston actuator, cutter, projectile, initiator, squib, or other type of opening device.

The inflator incorporates a valve mechanism that (1) opens the high pressure vessel to begin filling the airbag, (2) regulates the fill speed of the airbag, and (3) turns off (tailors down) the bag filling at the appropriate time to achieve the desired airbag energy absorbing characteristics for each unique set of crash conditions. The flow of gas from the compressed gas cylinder into the airbag is controlled by a spool that can vary the flow of gas from the compressed gas cylinder into the airbag based on different crash conditions by varying the cross sectional area of the gas flow. Crash variables can be sent as inputs into a crash processor algorithm. The processor determines the appropriate time to begin to deploy the airbag and the appropriate time to provide a second signal to control the appropriate level of pressure in the bag to achieve the optimum bag characteristics based on the given crash input variables.

The inflator designs for the various locations in the vehicle, such as the driver, passenger, or rear seat in an automobile, vary depending on the location. The vessel's size and shape and the valve component hardware can be adapted to each location's unique packaging "envelope" and vessel pressure requirements.

Other features of the present invention will become apparent from the following detailed description.

BRIEF DESCRIPTION OF THE DRAWINGS

FIG. 3 illustrates an alternative embodiment incorporating a squib or gas generator to adjust the position of the spool.

FIG. 4A is an enlarged cut-away view of the valve assembly.

FIG. 4B illustrates an outflow blast being semi-restricted by the spool.

FIG. 4D illustrates the full outflow stage of the device.

FIG. 4E illustrates the device when a second activation device is triggered, flow is cut-off, and the vessel slowly bleeds down.

FIG. 5 is a side view of the inflator installed in the dash of a typical automobile.

DETAILED DESCRIPTION OF THE INVENTION

Figure 1:
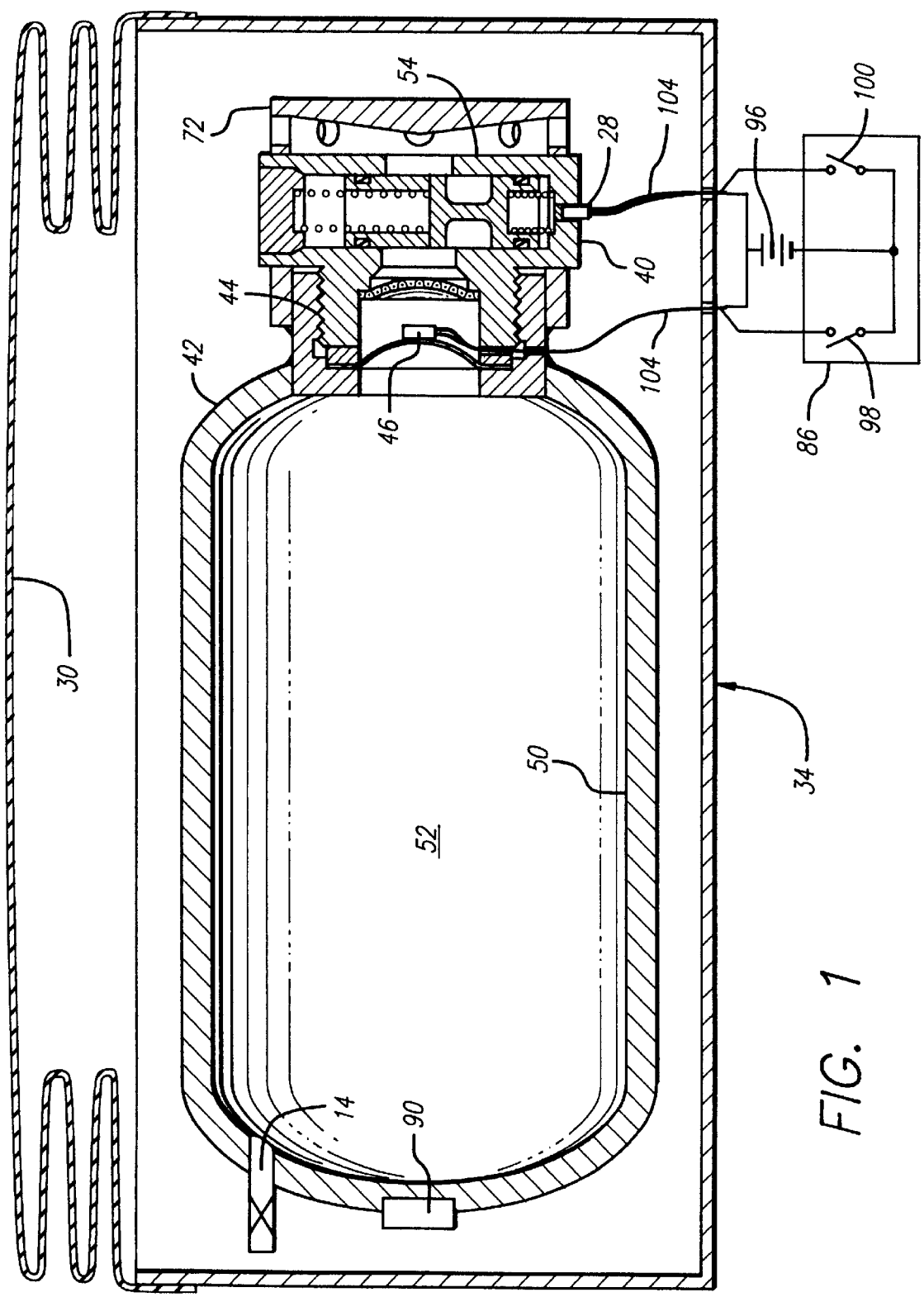
FIG. 1 is a cut away view of the inflator system and valve assembly of the present invention.
Figure 2:
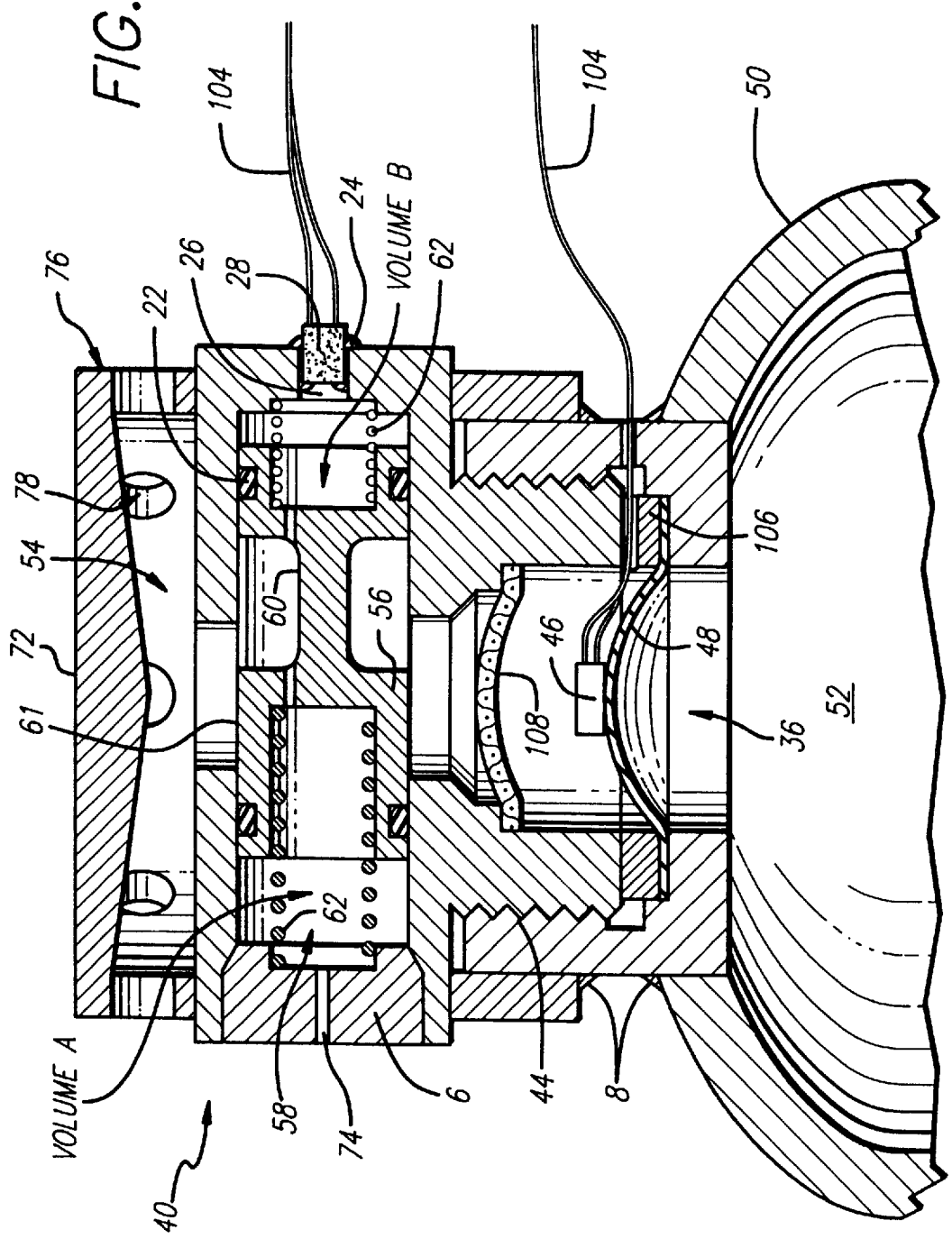
FIG. 2 is a close up cut away view of the inflator and valve of the present invention.

The preferred embodiment of the valve assembly 40 of the inflator 42 of the present invention is shown in FIGS. 1 and 2. A pressure vessel 50, such as a standard DOT 39 pressure vessel, contains pressurized gas 52. The pressurized gas 52 can be nitrogen, argon, carbon-dioxide, air, helium or any inert gas. A fill tube 14 can be located in one wall of the pressurized vessel 50. The pressurized gas is introduced into the pressure vessel through the fill tube 14. A pressure sensor 90 can also be positioned on the wall of the pressurized vessel 50 to detect and measure the pressure in the vessel.

The valve assembly 40 of the present invention is secured to the pressure vessel 50. In the embodiment illustrated in FIGS. 1 and 2, the valve assembly 40 is connected to the pressure vessel 50 by means of a threaded attachment 44. In an alternative embodiment, the valve assembly can be connected to the pressurized vessel directly without using a threaded system by welding the valve assembly to the vessel. Welds 8, as illustrated in FIG. 2, can also be used in conjunction with a threaded attachment 44. In addition, any other connection means known in the art can also be used to connect the valve to the vessel.

As illustrated in FIG. 2, a vessel opening means 36 is depicted in this embodiment as a detonator 46 attached to the non-pressurized side of a burst disc 48. The vessel opening means can be any other pyrotechnic opening device or rupture inducing means known in the art. A washer 106 is used to secure the burst disc 48 in place. A lead wire 104 is connected to the detonator 46 to allow the detonator 46 to be activated. Alternative opening means can also be used, such as an actuator with a piston movable from a retracted position to an extended position.

Also illustrated in FIG. 2 is a filter 108. This filter can prevent debris from the burst disc 48 from entering the valve assembly 40. The filter 108 or other support means positioned in the same location can also be used to support an actuator opening means in the alternative embodiment where an actuator is used to open the burst disc. Downstream from the burst disc 48, positioned within the valve assembly 40 is the flow regulating means 54. In the illustrated embodiment, the regulating means 54 incorporates a balanced spool 56. The spool 56 is positioned within the spool cavity 58 and can slide within the spool cavity 58 in the direction of the axis of the spool 56.

Figure 9:
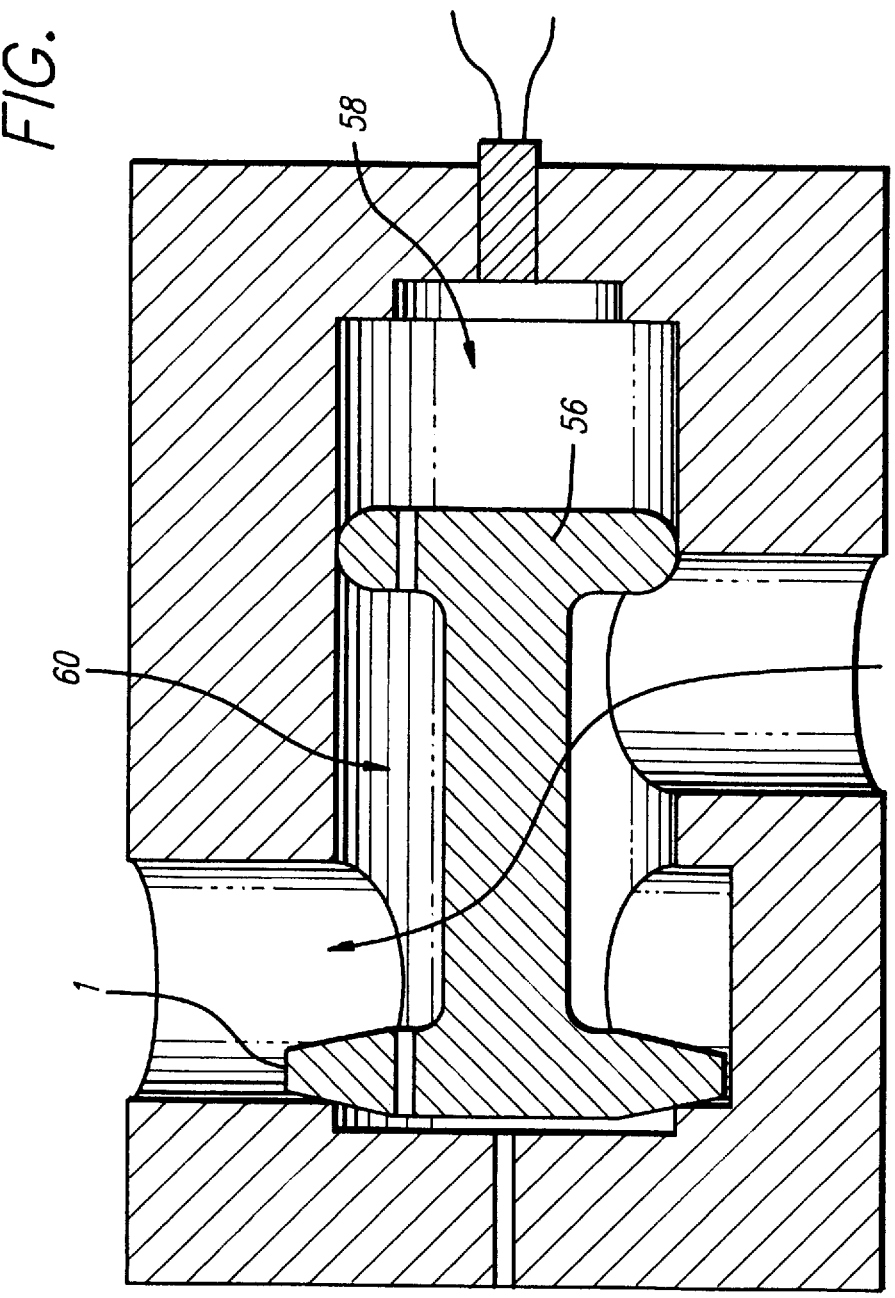
FIG. 9 is a side cut-away view of an alternative embodiment of the spool and spool cavity.

The spool 56 is generally cylindrical but has an indented portion 60 with a smaller diameter than that of the outer portion 61. The relationship of the indented portion 60 with the inner walls of the spool cavity 58 creates an outflow port 64, as illustrated in FIG. 4A through which air which is released from the vessel 50 and enters the airbag 30. FIG. 9 illustrates an alternative embodiment of the spool 56 and spool cavity 58. In this embodiment, the flow path through the valve assembly is aligned. The spool indented portion 60 is much larger than in the preferred embodiment and the outer portion 61 is relatively much smaller.

The airbag 30, illustrated in FIG. 1, is folded and secured to a reaction can 34 surrounding the inflator system 42. The airbag is capable of inflating into the occupant compartment of the vehicle. The airbag itself can be made of various materials, with the most common currently used in the art being a high strength nylon material. The airbag can also be made of new composite materials that are currently being developed for airbags. As an alternative to an "airbag", any other flexible restraint that can be inflated to protect an occupant of a vehicle can be incorporated into the present invention.

To initially insert the spool 56 into the spool cavity 58, one end of the cavity is open. After the spool is inserted into the cavity, a plug 6 can be secured over the open end of the spool cavity, securing the spool inside the cavity.

The spool 56 can be initially positioned by using centering springs 62 acting on each of the spool's ends. Springs of dissimilar materials, each being affected by the ambient temperature, can be used to adjust the spool's initial position by the temperature affecting the spring forces, causing the spool 56 to adjust its position. The position of the spool 56 can be configured such that under cold conditions the spool 56 moves to open a larger initial outflow port 64 while under hot conditions, the spool 56 moves to a position with a more restricted initial opening of the outflow port 64. This spool 56 can also be pre-set in its initial position and held in place by detents or a break away device.

The spool 56 is used to control the flow of gas 52 from the vessel 50 into the airbag 30 by adjusting the size of the outflow port 64 by sliding the spool within the spool cavity 58. The spool 56 is "balanced" in that the gas flowing through the indented portion of the spool does not move the spool in either direction perpendicular to the flow of the gas. As a result of the "balanced" design of the spool 56, the pressurized gas 52 passing through the outflow port 64 does not shift the spool 56. The gas 52 does not force the spool 56 to slide, in its lateral direction, perpendicular to the flow of the pressurized gas 52. The gas flow acts uniformly on each side of the spool 56 balancing the pressure effects. High out flowing gas pressures will, therefore, not interfere with regulating the control and position of the spool 56 and the flow of gas into the airbag 30. The spool 56, therefore, can control the initial aggressive air flow blast encountered with a compressed gas inflator.

The spool 56 controls the rate of gas 52 flowing from the pressurized vessel 50 using pilot pressures to adjust the size of the outflow port 64. A volume A is located at one end of the spool 56 within one end of the spool cavity. Similarly, a volume B is located at the other end of the spool within the other end of the spool cavity 58. The volumes A and B can be sealed from the indented portion of the spool and the flow path of the gas by placing O-rings around the portion of the spool on each side of the spool. The O-rings will also allow the spool to slide within the spool cavity. Alternatively, the spool can ride on a bearing or other means known in the art. The pressure within the valve assembly 40 is directed into volume B by means of pilot orifices 68, shown in this embodiment to be incorporated into the spool 56 itself. In alternative embodiments, the pilot orifice can be positioned in other locations. For example the orifices can be positioned in the walls of the spool cavity.

Figure 4C:
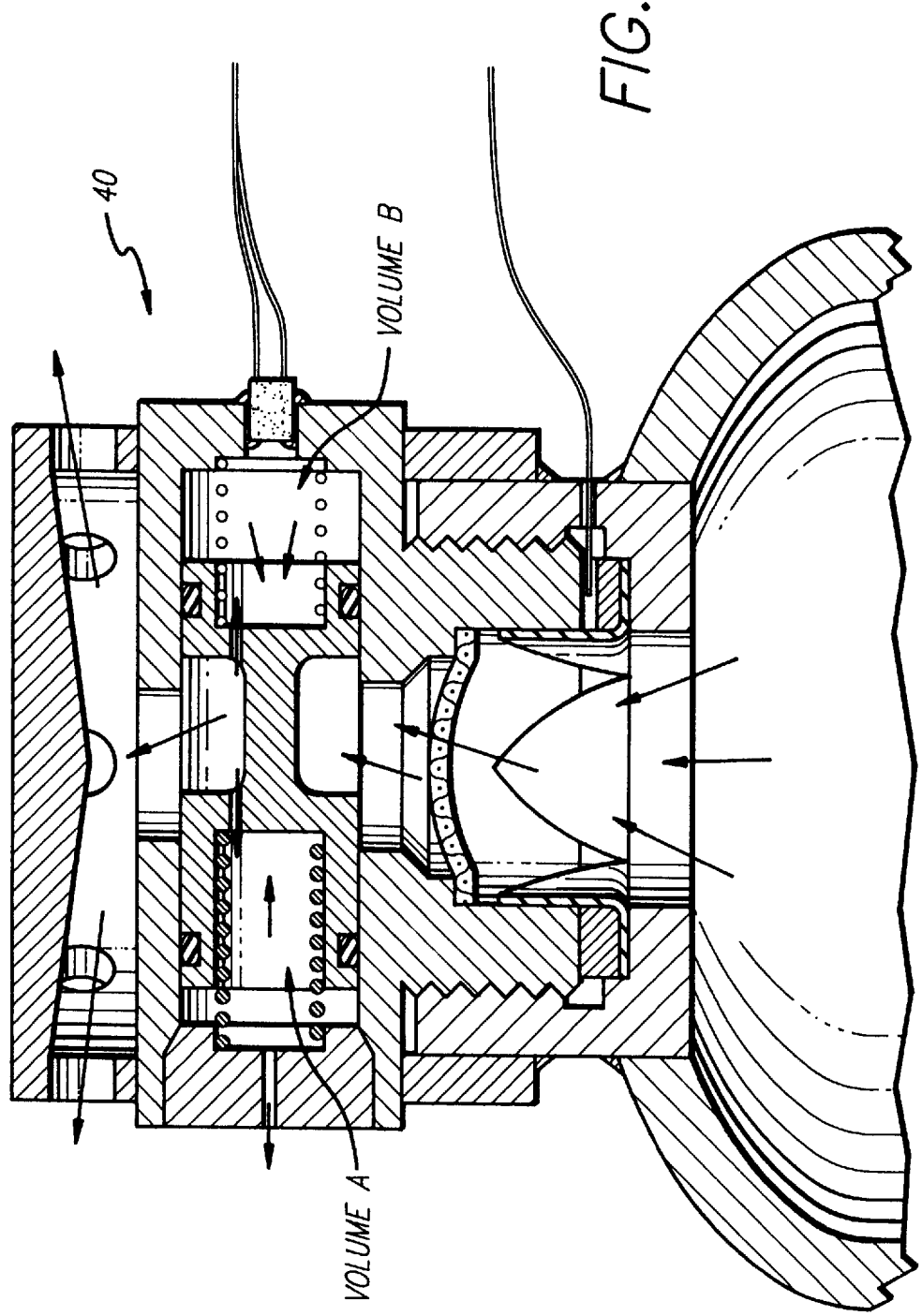
FIG. 4C illustrate the orifice opening further by spool movement.

As the pilot pressure in volume B increases, the pressure causes the spool 56 to move toward volume A as illustrated in FIGS. 4B and 4C. As the spool moves towards volume A, the size of the outflow port 64 increases, increasing the flow of gas into the airbag 30 at a desirable level.

Pilot orifices 70 leading into volume A can also be incorporated into the design of the spool 56. These orifices can add additional control to the movement of the spool 56 and the size of the outflow port 64. To allow the valve to compensate for different temperatures, the pilot orifices 68 and 70 can be made out of dissimilar temperature sensitive material. As the cross-sectional areas of the pilot orifices 68 and 70 would then vary differently in response to changes in temperature, this design can control the pressures in volumes A and volume B with respect to temperature variations, and therefore, change the size of the outflow port 64 in response to the different temperatures. In alternative embodiments, no pilot orifices connect volume A or volume B with the gas flow path. The pilot orifices can be used in conjunction with the pressure relief or ambient vent orifice 74, as described below to reduce the pressure build-up in volume A as the spool moves and compresses volume A.

As illustrated in FIGS. 1 and 2, an opener 28, that can be a pyrotechnic device, such as a squib, initiator, detonator, piston actuator or any other means known in the art of opening an orifice, can be positioned on the volume B side of the valve assembly 40. The opener 28 can be positioned in or over a vent orifice 26 which connects volume B with the area outside the valve assembly. Adhesive 24, such as conductive epoxy, is used to secure the opener 28 in the vent orifice 26. Lead wires 104 are attached to the opener 28 to allow the opener to be activated. The opener 28 can open the vent orifice 26 in volume B, thereby reducing the pressure in volume B to a lower level than the pressure in volume A. This causes the spool 56 to move back toward volume B, as illustrated in FIG. 4E.

The pressure relief ambient vent orifice 74 can also be made out of temperature sensitive material which would further provide control over the movement of the spool, depending on the valve temperature. In addition, adjusting the size of the vent orifice 74 in conjunction with real time input variables can also be used to adjust the flow of gas into the airbag during the inflation of the airbag. The size of the vent orifice 74 in volume A directly impacts the movement of the spool over time. A larger vent orifice 74 can produce a more aggressive inflation or can compensate for reduced aggression caused by reduced vessel pressures resulting from cold temperature extremes. A smaller vent orifice 74 can produce a less aggressive bag inflation or can compensate for the increased aggression caused by increased vessel pressures resulting from high temperature extremes.

The aggressiveness of the bag fill can also be adjusted to best match the real time variables unique to any given specific crash. In addition to controlling the size of the vent orifice 74 as a result of temperature effects, the size of the orifice can also be adjusted by a device that is linked to sensors and a processor algorithm. Adjustments to the size of the orifice can be made according to real time inputs. A device for adjusting the size of the vent orifice 74 can be a solenoid, servo motor, piezoelectric element, hydraulics, linear actuator or any other means known in the art of adjusting the flow area through an orifice.

FIG. 1 also illustrates a simple schematic of the basic components of the activating circuits. The circuits are powered by a battery 96. When the processor 86 determines that a collision has occurred, a deployment signal 98 is sent through lead wires 104 to the detonator 46, thereby opening the pressure vessel 50. When the processor 86 determines that the flow through the valve assembly 40 should be reduced, the processor sends a second signal, the cut off signal 100, through other lead wires 104 to the opener 28, thereby opening the vent orifice 26.

In an alternative embodiment, as illustrated in FIG. 3, another pyrotechnic device such as a squib, or other gas generator 38 can be positioned on the volume A side of the valve assembly 40. This squib 38 can generate gas that increases the pressure in volume A thereby moving the spool 56 back towards volume B. In other alternative embodiments, the use of a solenoid, servo device, linear actuator or any other device known in the art can be used to control the movement of the spool 56.

Figure 7:
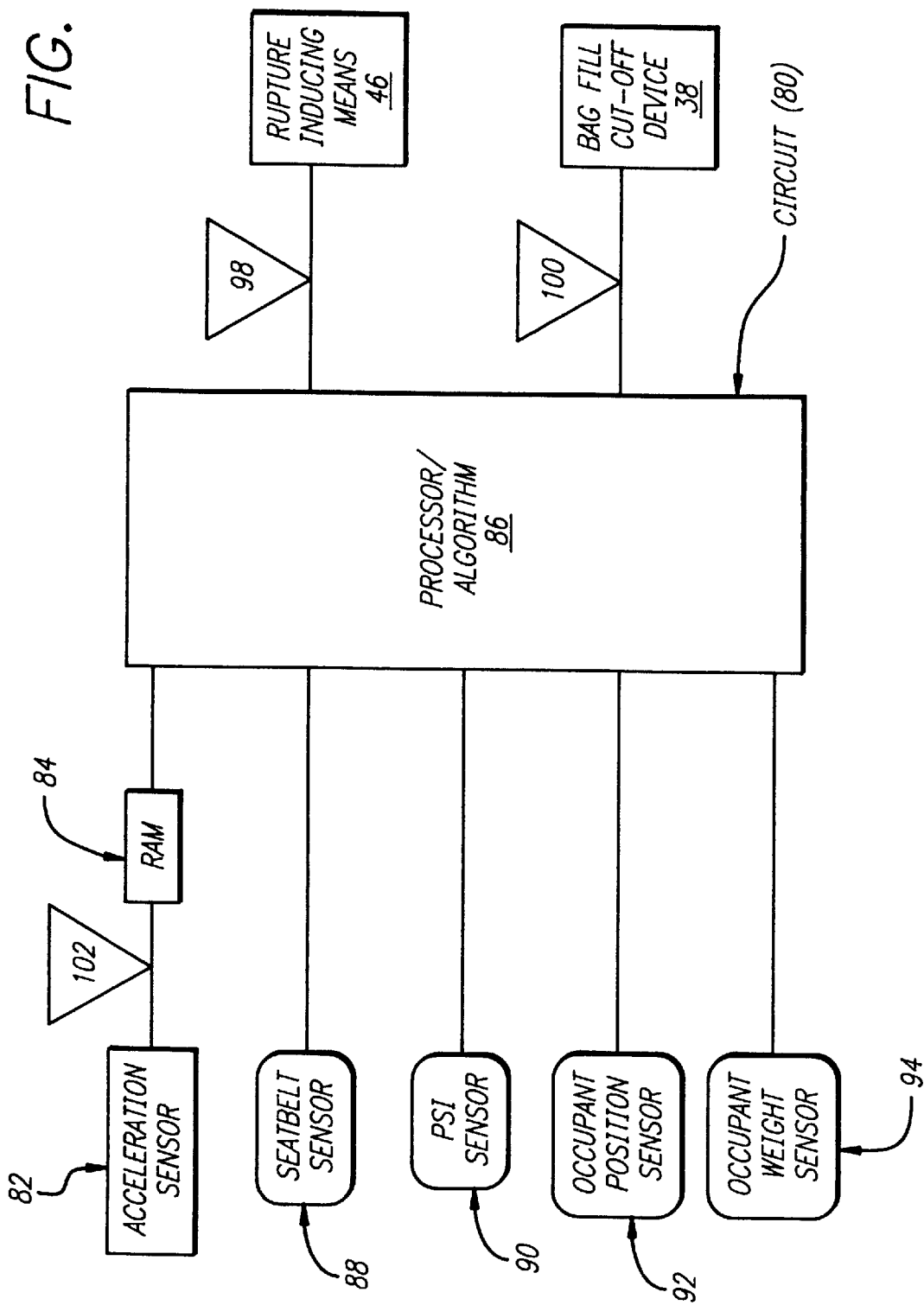
FIG. 7 is a schematic of the control circuit of the present invention.

FIG. 7 illustrates, a more detailed schematic of the circuit 80 of the present invention. An acceleration sensor 82 is connected through a Random Access Memory (RAM) card 84 into a processor 86 that has the capability of performing an algorithm based on various inputs. As illustrated in FIG. 7, other inputs into the processor 86 can be responsive to seatbelt sensor 88, a pressure (e.g., pounds per square inch) sensor 90 that is adjusted for temperature compensation, an occupant position sensor 92, and an occupant weight sensor 94. Signals from the algorithm in the processor 86 can be sent to the detonator 46 and the opener 28. A crash signal 102 is sent from a crash sensor or acceleration sensor 82 to the processor 86. The crash signal 102 causes the vessel opening means 36, such as the detonator 46 and burst disc 48, illustrated in FIG. 2, to open, allowing the pressurized gas 52 to escape from the vessel 50. The flow from the vessel 50 is regulated by the movement of the flow control device—the spool 56.

When determined by the algorithm in the processor 86 to be the appropriate time, in response to the various crash input conditions sent from the sensors 88 through 94, the opener 28 is activated, moving the spool 56 towards volume B and the gas flowing into the airbag tailors off to obtain the appropriate bag decelerating characteristics.

The pyrotechnic device or opener 28 receives a cut off signal 100 sent from the processor 86, opening the vent orifice 26 in volume B thereby reducing the pressure in volume B. The flow through the outflow port 64 tailors off or "cuts-off" depending on the specific crash circumstances. The rapid reduction in pressure in volume B compared to the higher pressure in volume A will cause the spool 56 to move back to a final flow "cut-off" position, as illustrated in FIG. 4E, reducing the size of the valve outlet port 64 and the flow of gas into the airbag 30 to a benign limited flow or bleed down.

In the alternative embodiment illustrated in FIG. 3, the squib 38 receives a cut off signal 100 sent from the processor 86, and activates, creating additional pressure in volume A. The flow through the outflow port 64 then tailors off or "cuts-off" depending on the specific crash circumstances, as the spool moves back towards volume B. The rapid increase in pressure in volume A as a result of the pyrotechnic burning of the squib 38 will cause the spool 56 to move back toward its original position or to another final resting point as illustrated in FIG. 4E reducing the size of the vessel outlet port 64 and the flow of gas into the airbag 30 to a benign limited flow or bleed down. The squib 38 can be designed to have a "burn rate" to move the spool 56 to the "cut-off" point very quickly while, at the same time, maintain the pressure in volume A to keep the spool 56 in the cut-off position throughout the vessel bleed down.

In alternative embodiments, the flow of the gas through the valve need not be controlled by the processor algorithm 86. The valve can be designed to adjust the flow of gas through the valve simply using the pressure vents and orifices to adjust the position of the spool 56.

The storage vessel pressure and volume can be set at a level which covers the pre-calculated high end or worst extreme within reasonable percentages of possible variables during potential crashes. An example of this high end condition is a ninety-fifth percentile person in a high severity crash, unbelted, at the cold ambient condition. As long as the occupant in this scenario is not harmed when the airbag is deployed under these conditions, the entire contents of the vessel would be emptied into the bag, with no need for any flow cutoff. Given the other possible extreme, such as a fifth percentile person in a low severity crash, or where the occupant is sitting close to the airbag, at a high ambient temperature condition, the inflator would cut-of the bag fill early to provide bag characteristics that are not too "hard" and that will not injure the occupant by causing the occupant to rebound from the airbag or through the occupant rearward. In this scenario, the inflator simply bleeds off the remaining gas in a benign manner to prevent the airbag's pressure increasing further.

Shown downstream from the spool 56 in FIGS. 1 and 2 is the outlet diffuser or thrust diverter 72. The diverter can be a cylinder 76 with holes 78 oriented around its perimeter to cause a neutral thrust diversion as the gas exits the valve assembly 40 into the airbag 30 or reaction can 34, as illustrated in FIG. 1. The gas flowing from the valve assembly 40 exits through a diffuser/thrust diverter 72 into the airbag 30. As illustrated in FIG. 1, a reaction can 34 may house the inflator and provides an attachment for the airbag 30. In addition, the reaction can 34 can provide an attachment for a protective decorative cover for the inflator 42, and also provides a means for mounting the inflator 42 to the vehicle instrument panel (dash) structure 12.

The inflator 42 can be made simple or sophisticated, depending on the application, by providing the desired crash inputs to control the opening and tailoring off characteristics of the inflator. For aftermarket applications, where it may be default to incorporate specific sensors, such as weight and position sensors, the use of a manual switch can be used. For example, the switch could normally default to a "child" setting but the occupant of the vehicle can change the setting to an "adult" setting, which would change the characteristics of the airbag 30 as it inflates in response to a collision. Alternatively, a simple limit switch installed in the seat area can detect the actual weight of the occupant and can be installed so that a lighter person or child would not activate the switch while a person whose weight is above a predetermined limit would activate the switch. This limit switch performs the same function as a manual switch. In addition, the limit switch eliminates the possibility of human error of improperly setting the switch. A limit switch can also be a low cost alternative to a weight transducer which is capable of obtaining the actual specific weight of the occupant of the passenger.

Figure 8:
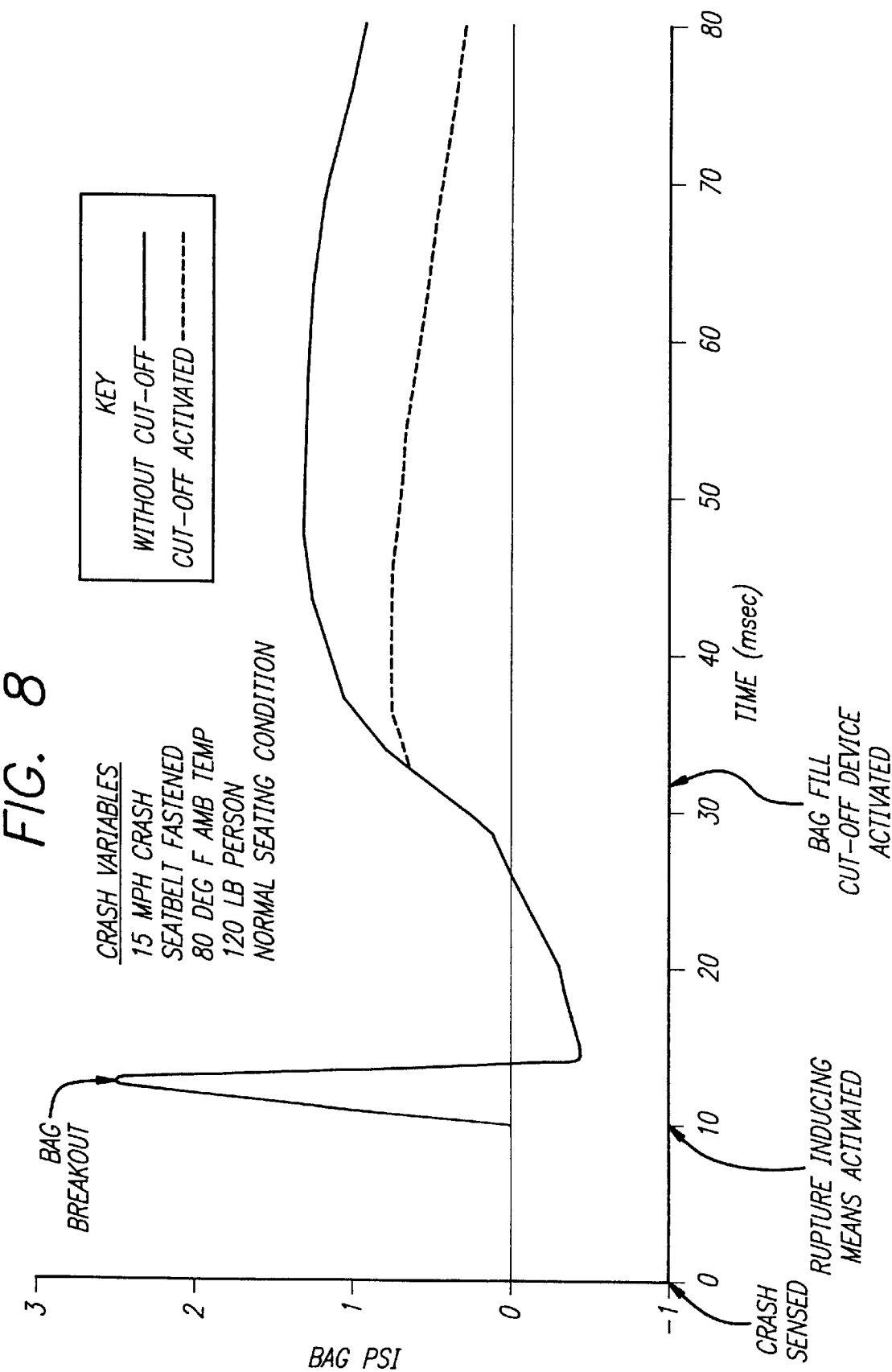
FIG. 8 is a bag PSI curve scenario for a typical example of the pressure control of the airbag assembly.

FIG. 8 illustrates a possible pressure-time line for the valve assembly system. The figure illustrates the changing pressure of the gas being released from the valve assembly 40 into the airbag 30 in relation to time. When the crash is first sensed, the initial pressure in the valve is zero, as the rupture inducing means has not been activated. Once the signal is sent from the acceleration sensor 82 to the processor algorithm 86, the processor sends a signal to the vessel opening means 36 and the detonator 46 is activated. As illustrated in FIG. 8, the pressure quickly rises until the bag breaks out of the assembly. The pressure then quickly decreases. The spool 56 adjusts its position and the pressure increases. At the appropriate time, the opener 28 is activated and the flow cutoff is initiated. The spool 56 re-adjusts, and the pressure tapers off.

The inflator can be adjusted to achieve the desired pressure curves for various inputs including (1) deceleration during the crash, (2) whether the seatbelt was fastened or unfastened, (3) the ambient temperature or vessel pressure, (4) and the weight of the passenger or driver and the position of the occupant relative to the airbag. The inflator can be designed for the input conditions such as crash severity levels, which can be interpreted by the crash sensor algorithm in the processor 86. The temperature compensation timing can be determined by the input of the pressure sensor 90 into the algorithm since the ambient temperature affects the storage pressure. The seatbelt sensor 88 can be used as an input to the algorithm in the processor 86 to determine different airbag characteristics for a belted or unbelted occupant. In addition, occupant weight and position sensors are now becoming available.

An additional feature of the present invention is that it can mitigate the effects of an undesired inflation. Should the airbag inadvertently activate, either if the burst disc fails, the rupture means inadvertently activates, or any other event occurs which was not signaled by the crash algorithm, the processor 86 can activate the opener 28 to cut-off the full output flow and allow the vessel 50 to bleed down safely. This inadvertent opening can be determined by the algorithm in the processor 86. This safety feature prevents the possibility of injuring the occupant of the vehicle by the unintentional airbag deployment and also reduce the chance of the "startle effect" which can cause the driver to crash. The inadvertent deployment could be detected by the pressure sensor 90 which detects a sharp pressure drop occurring without the activation signal from the processor 86. This safety feature is not available on inflator designs in the prior art.

Another concern with compressed source inflators is the need to provide a second burst disc to allow for it to rupture during vessel over pressurization occurring during a vehicle fire. The addition of this second burst disc adds another possibility for failure. In the present design, however, over pressurization can be detected by the pressure sensor and the processor can thereby activate the vessel opening means and the flow cut-off simultaneously, thus allowing for the vessel to bleed down in a benign manner. Therefore, there is no need for a second lower pressure rated burst disc which decreases the overall reliability.

Figure 6:
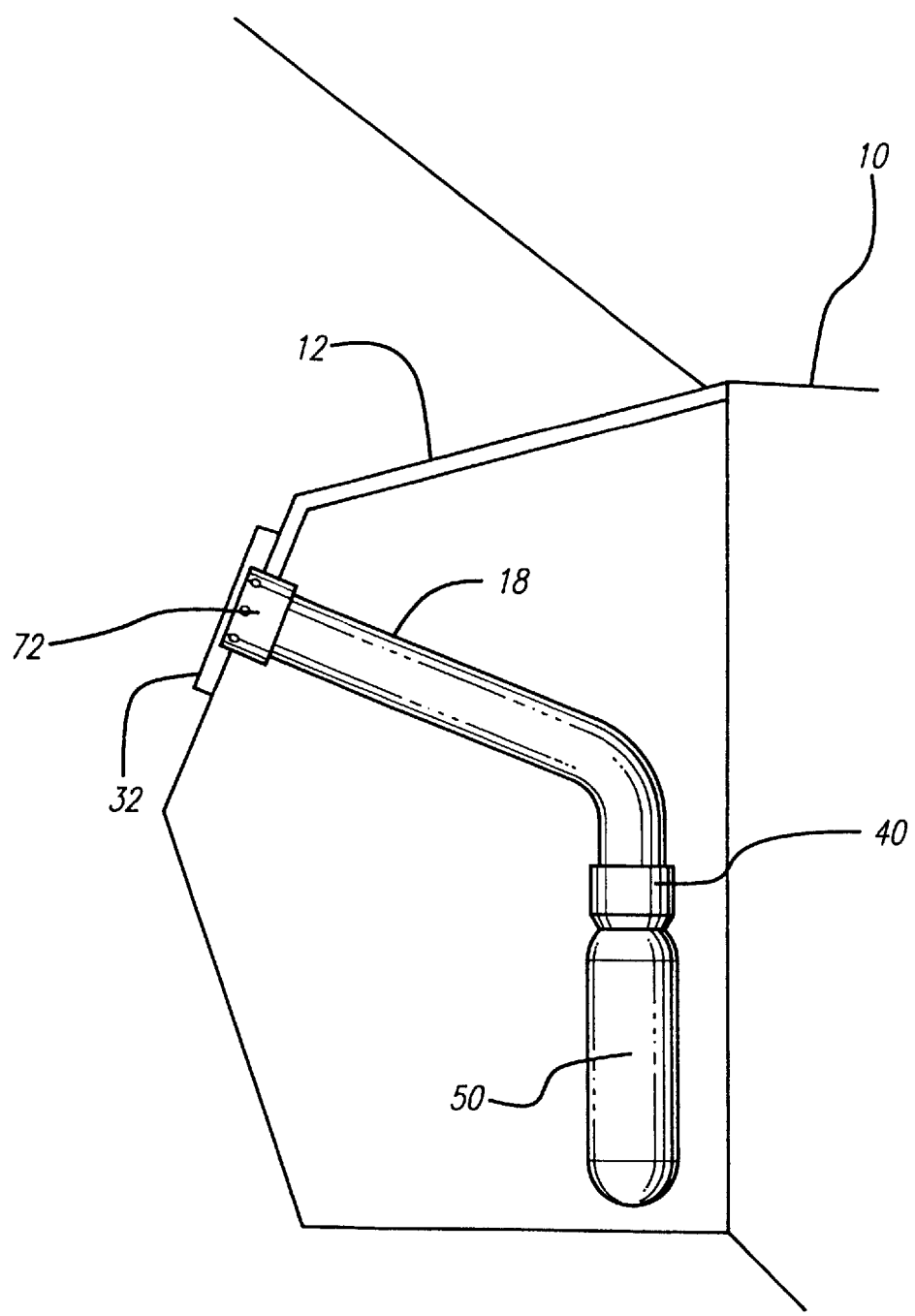
FIG. 6 is side view of the inflator installed in another location in the dash of a typical automobile.

The airbag system can be positioned and inflated to restrain an occupant during a frontal or side impact or an impact from any another direction by mounting the airbag system in appropriate positions. FIGS. 5 and 6 illustrate two designs for attaching the inflator of the present invention into a typical vehicle 10, either by the manufacturer or aftermarket. In FIG. 5, the assembly is configured in a basically horizontal position. The inflation system 20 is positioned in the dash 12 of the vehicle 10. A low profile airbag cage 32, containing the airbag 30, is mounted on the front end of the dash 12. Alternatively, the system can be in a more vertical position positioned within the dash 12 of the vehicle 10. This positioning might accommodate installation constraints. FIG. 6 illustrates another positioning of the inflation system 20. In this configuration, the pressurized vessel 50 and the valve assembly 40 can be positioned in a remote location at a distance form the airbag cage 32. FIG. 6 illustrates the airbag cage 32 positing on the front of the dash 12. The other components of the inflation system 20, the pressure vessel 50 and valve assembly 40 are positioned on the opposite side of the dash 12. A ducting 18 connects the pressure vessel 50 and valve assembly 40 with the airbag cage 32.

In addition to the locations illustrated in FIG. 5 and 6, the airbag system of the present invention can be positioned on the back portion of a seat or headrest, on the dashboard in front of an occupant or any other desired location. The airbag system can be either temporarily or permanently secured in these positions.

The invention may be embodied in other specific forms without departing from the spirit or essential characteristics of the invention. For example, the inflator can have different designs for the various locations, driver, passenger, etc. and different vessel sizes, shapes, and valve component hardware. In addition, the valve assembly of the present invention can be used for applications, other than inflating airbags, where the flow of fluid needs to be controlled. The valve assembly can be used with a compressed gas source, as described above, or alternatively, can be incorporated with a hybrid design. The valve can also be used with gas generating inflators known in the art, to control the inflation rate of the restraint, if desired, and provide flow tailoring or cut-off. Gas generating inflators can therefore be used with sensors and algorithms to provide controlled output flow based on specific crash variables.

Figure 10:
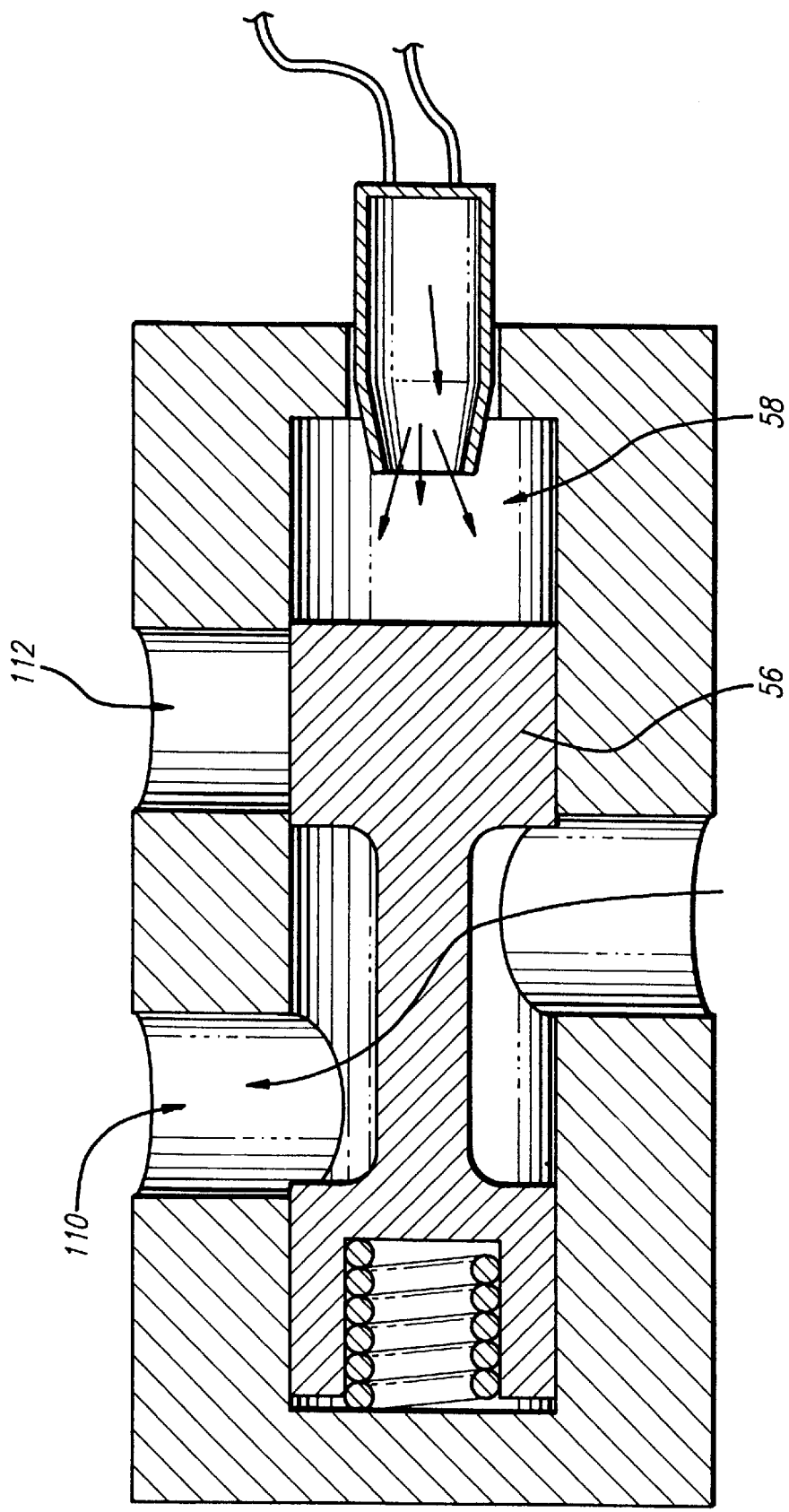
FIG. 10 is a side cut-away view of an alternative embodiment of the spool and spool cavity that can be used to control the flow of gas from a standard pyrotechnic inflator.

For example, as illustrated in FIG. 10, the valve can be used to add control to a standard pyrotechnic inflator. In this embodiment, the valve has two releases. The valve can either direct the released gas through an external vent 110, such that the gas will not enter the airbag or other restraint. Alternatively, when the spool 56 is moved into another position, the released gas can exit the valve through a restraint vent 112 and thereby enter the airbag or other restraint. By controlling the release of gas through the two vents, the airbag inflation characteristics can be controlled. This embodiment can be the same as the embodiments described above if an additional means is provided to vent the increasing gas pressure from the high pressure gas generating source after the flow cut-off is activated. When the outlet flow from the high pressure gas generating source is choked off or shut off, the gas pressure would rapidly increase within the pressure vessel, potentially causing the vessel to explode as a result of the high internal pressures. Therefore, a separate pressure relieve device, such as a burst disc, can be included to safely vent any excessive pressure build-up in the vessel.

The present embodiment is therefore to be considered in all respect as illustrative and not restrictive, the scope of the invention being indicated by the claims below rather than by the foregoing description.

What is claimed:

1. An inflator system for inflating a vehicle occupant restraint system comprising:

an inflatable restraint;

a container, containing a compressed gas for inflating said inflatable restraint;

means for blocking said compressed gas from flowing into said inflatable restraint;

means for opening said blocking means thereby releasing said compressed gas from said container into said inflatable restraint; and control means for controlling the flow of gas from said container into said inflatable restraint, such that when said compressed gas is released from said container, the inflatable restraint inflates, said control means capable of increasing or decreasing the flow of gas;

said control means including a valve, said valve having a first opening operatively interconnected to said container for gas to enter said valve from said container, a second opening for gas to exit said valve into said inflatable restraint, a flow path through said valve, and means for increasing or decreasing a cross sectional area of said flow path through said valve;

said means for increasing or decreasing said cross sectional area of said flow path including a spool positioned in said flow path capable of moving in relation to said valve relative to said flow path and having an outer section, an indented portion, a first end and a second end, and means for moving said spool within said flow path to adjust an effective cross sectional area of said flow path wherein said means for moving said spool includes pilot orifices, said pilot orifices controlling the pressure to at least one of said ends of said spool.

2. The inflator system of claim 1 where said pilot orifices are positioned within said spool.

3. An inflator system as set forth in claim 1 wherein said means for moving said spool further includes means for venting pressure from one end of said spool to reduce pressure on said end.

4. An inflator system as set forth in claim 1 wherein said means for moving said spool further includes gas generation means for that releases gas and increases pressure on one of said ends of said spool.

5. An inflator system for inflating a vehicle occupant restraint system comprising:

an inflatable restraint;

a container, containing a compressed gas for inflating said inflatable restraint;

means for blocking said compressed gas from flowing into said inflatable restraint;

means for opening said blocking means thereby releasing said compressed gas from said container into said inflatable restraint; and control means for controlling the flow of gas from said container into said inflatable restraint, such that when said compressed gas is released from said container, the inflatable restraint inflates, said control means capable of increasing or decreasing the flow of gas; said control means including a valve, said valve having a first opening operatively interconnected to said container for gas to enter said valve from said container, a second opening for gas to exit said valve into said inflatable restraint, a flow path through said valve, and means for increasing or decreasing a cross sectional area of said flow path through said valve;

said means for increasing or decreasing said cross sectional area of said flow path including a spool positioned in said flow path capable of moving in relation to said valve relative to said flow path and having an outer section, an indented portion, a first end and a second end, and means for moving said spool within said flow path to adjust an effective cross sectional area of said flow path wherein said means for moving said spool includes means for venting pressure from one end of said spool to reduce pressure on said end.

6. An inflator system for inflating a vehicle occupant restraint system comprising:

an inflatable restraint;

a container, containing a compressed gas for inflating said inflatable restraint;

means for blocking said compressed gas from flowing into said inflatable restraint;

means for opening said blocking means thereby releasing said compressed gas from said container into said inflatable restraint; and control means for controlling the flow of gas from said container into said inflatable restraint, such that when said compressed gas is released from said container, the inflatable restraint inflates, said control means capable of increasing or decreasing the flow of gas; said control means including a valve, said valve having a first opening operatively interconnected to said container for gas to enter said valve from said container, a second opening for gas to exit said valve into said inflatable restraint, a flow path through said valve, and means for increasing or decreasing a cross sectional area of said flow path through said valve;

said means for increasing or decreasing said cross sectional area of said flow path including a spool positioned in said flow path capable of moving in relation to said valve relative to said flow path and having an outer section, an indented portion, a first end and a second end, and means for moving said spool within said flow path to adjust an effective cross sectional area of said flow path wherein said means for moving said spool includes a gas generation means that releases gas and increases pressure on one of said ends of said spool.

7. An inflator system positioned in a moving vehicle, said inflator system having:

an inflatable restraint for restraining motion of a passenger when inflated;

a cylinder containing a compressed gas;

a means for releasing said compressed gas from said cylinder including:
  a means for detecting deceleration;
  a burst disc that can open when activated;
  a means for opening the burst disc; and
  a wire connecting the means for detecting deceleration with the means for opening the burst disc such that when a deceleration is detected, a signal is sent from the deceleration detection means to the burst disc opening means, thereby opening the burst disc; and a means for controlling the flow of compressed gas from said cylinder into said inflatable restraint, said inflatable restraint being attached down-flow from said control means, such that when said compressed gas is released from said cylinder, the inflatable restraint inflates, said control means including:
  a flow valve between said cylinder and said inflatable restraint with one end of said valve being operatively interconnected to said cylinder;
  a flow path though said valve;
  a spool positioned in said flow path capable of being moved relative to said flow path, said spool having an outer portion and an indented portion, and a first end and a second end; and
  a means for controlling the movement of said spool within said flow path to adjust the cross sectional area of said flow path, said means including pilot orifices positioned in said spool.

8. The inflator system of claim 7 where the means for controlling the movement of said spool further includes means for venting pressure from one end of the spool to reduce the pressure on said end.

9. The inflator system of claim 7 where said means for moving said spool further includes a gas generation means positioned within said valve; said gas generation means capable of releasing gas and increasing the pressure on one side of said spool.

10. A valve system for controlling the flow of a gas comprising:

a valve having a first opening for gas to flow into said valve, a second opening for gas to flow out of said valve, a flow path through said valve connecting said first opening with said second opening; and a spool to control the flow of gas through said valve by increasing or decreasing a cross sectional area of said flow path, said spool having an outer portion, an indented portion, a first end and a second end; and means for moving said spool such that aligning said indented portion of said spool with said flow path through said valve increases said cross sectional area of said flow path and dis-aligning said indented portion with said flow path decreases said cross sectional area of said flow path, wherein said means for moving said spool includes pilot orifices that control the pressure on at least one of said ends of said spool.

11. A valve system for controlling the flow of a gas comprising:

a valve having a first opening for gas to flow into said valve, a second opening for gas to flow out of said valve, a flow path through said valve connecting said first opening with said second opening; and a spool to control the flow of gas through said valve by increasing or decreasing a cross sectional area of said flow path, said spool having an outer portion, an indented portion, a first end and a second end; and means for moving said spool such that aligning said indented portion of said spool with said flow path through said valve increases said cross sectional area of said flow path and dis-aligning said indented portion with said flow path decreases said cross sectional area of said flow path, wherein said means for moving said spool includes means for venting pressure from one end of the spool to reduce the pressure on said end.

12. An inflator system for inflating a vehicle occupant restraint system comprising:

an inflatable restraint;

a container, containing a compressed gas for inflating said inflatable restraint;

means for blocking said compressed gas from flowing into said inflatable restraint;

means for opening said blocking means thereby releasing said compressed gas from said container into said inflatable restraint; and control means for controlling the flow of gas from said container into said inflatable restraint, such that when said compressed gas is released from said container, the inflatable restraint inflates, said control means capable of increasing or decreasing the flow of gas; said control means including a valve, said valve having a first opening operatively interconnected to said container for gas to enter said valve from said container, a second opening for gas to exit said valve into said inflatable restraint, a flow path through said valve, and means for increasing or decreasing a cross sectional area of said flow path through said valve;

said means for increasing or decreasing said cross sectional area of said flow path including a spool positioned in said flow path capable of moving in relation to said valve relative to said flow path and having an outer section, an indented portion, a first end and a second end, and means for moving said spool within said flow path to adjust an effective cross sectional area of said flow path wherein said means for moving said spool includes a pilot orifice, said pilot orifice extending from said indented portion of said spool to one of said first end and said second end of said spool without passing through said indented portion.

* * * * *